(12) United States Patent
Li et al.

(10) Patent No.: US 10,071,400 B2
(45) Date of Patent: Sep. 11, 2018

(54) ULTRASONIC LENS CLEANING WITH TRAVELLING WAVE EXCITATION

(71) Applicant: Texas Instruments Incorporated, Dallas, TX (US)

(72) Inventors: Yunhong Li, Santa Clara, CA (US); David P. Magee, Allen, TX (US); Stephen John Fedigan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 131 days.

(21) Appl. No.: 15/186,944

(22) Filed: Jun. 20, 2016

(65) Prior Publication Data
US 2017/0361360 A1    Dec. 21, 2017

(51) Int. Cl.
| H01L 41/09 | (2006.01) |
| B08B 7/02 | (2006.01) |
| G02B 27/00 | (2006.01) |

(52) U.S. Cl.
CPC .......... *B08B 7/028* (2013.01); *G02B 27/0006* (2013.01)

(58) Field of Classification Search
CPC ........................... B08B 7/028; G02B 27/0006
USPC .................................................. 310/314–319
See application file for complete search history.

(56) References Cited

U.S. PATENT DOCUMENTS

| 3,643,135 | A | 2/1972 | Devore et al. |
| 3,681,626 | A | 8/1972 | Puskas |
| 4,019,073 | A | 4/1977 | Vishnevsky et al. |
| 4,271,371 | A | 6/1981 | Furuichi et al. |
| 4,510,411 | A | * | 4/1985 | Hakamata ............. H02N 2/163 310/316.02 |
| 4,607,652 | A | 8/1986 | Yung |
| 5,173,631 | A | * | 12/1992 | Suganuma ............. H02N 2/14 310/316.02 |
| 6,078,438 | A | 6/2000 | Shibata et al. |
| 7,492,408 | B2 | 2/2009 | Ito |
| 7,705,517 | B1 | 4/2010 | Koen et al. |
| 8,293,026 | B1 | 10/2012 | Bodor et al. |
| 8,385,733 | B2 | 2/2013 | Nomura |
| 9,228,183 | B2 | 1/2016 | Lipkens et al. |
| 2003/0214588 | A1 | 11/2003 | Takizawa et al. |
| 2004/0134514 | A1 | 7/2004 | Wu et al. |
| 2005/0280712 | A1 | 12/2005 | Kawai |
| 2008/0166113 | A1 | 7/2008 | Yasuda et al. |

(Continued)

FOREIGN PATENT DOCUMENTS

| CN | 104709241 A | 6/2015 |
| RU | 2393644 C1 | 6/2010 |

OTHER PUBLICATIONS

International Search Report for PCT/US2017/044807 dated Nov. 2, 2017.

(Continued)

*Primary Examiner* — Thomas Dougherty
(74) *Attorney, Agent, or Firm* — Michael A. Davis, Jr.; Charles A. Brill; Frank D. Cimino

(57) ABSTRACT

Disclosed examples include ultrasonic lens cleaning systems and driver circuits to clean a lens using four or more transducer segments mechanically coupled to the lens, in which the driver circuit provides phase shifted oscillating signals to the transducer segments to generate a mechanical traveling wave rotating around the center axis of the lens to vibrate the lens for improved ultrasonic cleaning.

9 Claims, 9 Drawing Sheets

(56) References Cited

U.S. PATENT DOCUMENTS

| | | |
|---|---|---|
| 2009/0011243 A1 | 1/2009 | Yamada et al. |
| 2010/0171872 A1 | 7/2010 | Okano |
| 2011/0228389 A1 | 9/2011 | Ohashi |
| 2012/0243093 A1 | 9/2012 | Tonar et al. |
| 2017/0048061 A1* | 2/2017 | Bohdan ................. H04L 9/0662 |

OTHER PUBLICATIONS

International Search Report for PCT/US2017/038348 dated Sep. 7, 2017.
English language translation of Abstract from JP 0011260781A dated Sep. 24, 1999, cited by International Search Report for PCT/US2017/038348; 2 pages.
Graff, "Wave Motion in Elastic Solids", Dover, 1991, 3 pgs.
Hagedorn et al., "Travelling Wave Ultrasonic Motors, Part I: Working Principle and Mathematical Modelling of the Stator", Journal of Sound and Vibration, 1992, 155(1), pp. 31-46.
Fedigan, et al. "Ultrasound Lens Structure Cleaner Architecture and Method," U.S. Appl. No. 15/225,212, filed Aug. 1, 2016 (41 pages).
Li, et al., "Ultrasound Lens Structure Cleaner Architecture and Method Using Standing and Traveling Waves," U.S. Appl. No. 15/395,665, filed Dec. 30, 2016 (55 pages).

* cited by examiner

ULTRASONIC LENS CLEANING WITH TRAVELLING WAVE EXCITATION

TECHNICAL FIELD

The present disclosure relates generally to lens cleaning systems and more particularly to ultrasonic cleaning systems with current sensing.

BACKGROUND

Lenses are used for a variety of optical systems, such as camera lenses, light source lenses, etc. In outdoor applications, particularly vehicle-based systems, camera or light source lenses are subject to ambient weather conditions, dirt and debris, and other contaminants which can obstruct or interfere with optical transmission through the lens. It is desirable to provide a substantially clean or clear optical path through the lens for camera-based systems to facilitate proper imaging, and for light source systems to facilitate the expected area illumination. Outdoor surveillance cameras and lighting systems, as well as vehicle-based lighting and camera systems are often inconveniently located for manual cleaning and automated lens cleaning systems are therefore desirable. Ultrasonic cleaning uses an electromechanical transducer, such as a piezoelectric actuator attached to the bottom of a lens element or lens cover plate, to vibrate the lens to remove debris from the lens surface. In some cases, the mechanical system including the transducer and the lens undergoes resonance, and exhibits a particular spatial vibrating pattern as a standing wave determined by its mechanical properties and boundary conditions. However, standing wave excitation of a dirty lens results in a wave front that is fixed in space, and certain portions of the lens called nodal regions do not vibrate. Consequently, cleaning effectiveness is hindered, particularly at or near the nodal regions.

SUMMARY

Disclosed examples include ultrasonic lens cleaning systems and driver circuits to clean a lens using an even number of four or more transducer segments mechanically coupled to the lens. A driver circuit provides phase shifted oscillating signals to the transducer segments to generate a mechanical traveling wave rotating around the center axis of the lens to vibrate the lens for improved ultrasonic cleaning. Methods are disclosed for cleaning a lens using a plurality of transducer segments, including providing a first oscillating signal, providing a second oscillating signal phase shifted from the first oscillating signal by a non-zero angle, amplifying the first and second oscillating signals, providing the first amplified signal to a first set of the transducer segments, and providing the second amplified signal to a second set of the transducer segments to generate a mechanical traveling wave to vibrate the lens.

DETAILED DESCRIPTION

Figure 1:
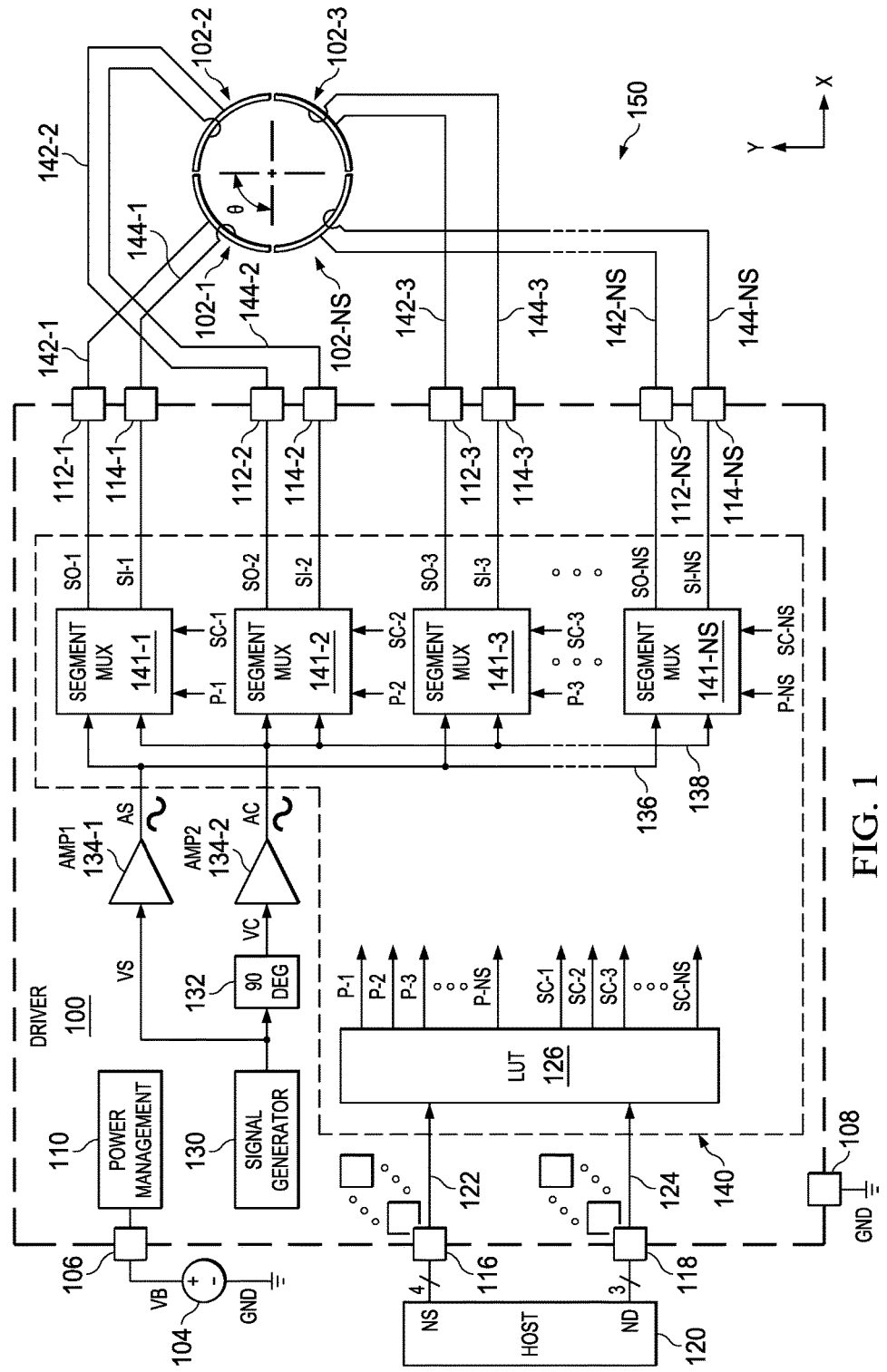
FIG. 1 is a schematic diagram of an ultrasonic lens cleaning system including a four-segment transducer arrangement and a driver IC to provide phase shifted transducer signals to generate a mechanical traveling wave rotating around a center axis of a lens.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections. Also, the term "lens" is intended to include a lens that is part of a camera lens system or a cover lens that covers a camera lens system.

Figure 2:
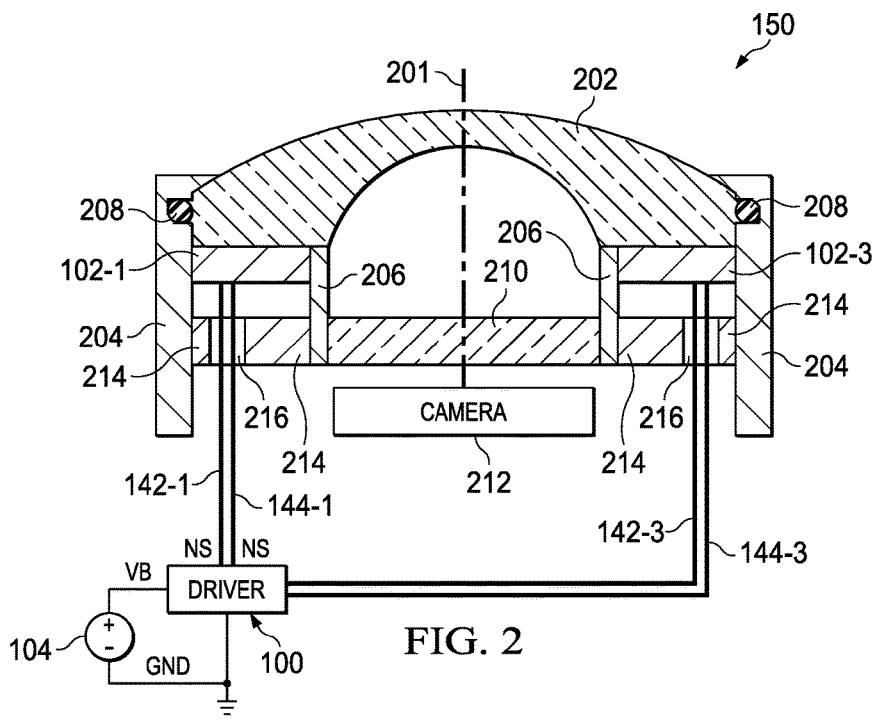
FIG. 2 is a partial sectional side elevation view of a camera lens assembly including an ultrasonic lens cleaning system of FIG. 1.
Figure 3:
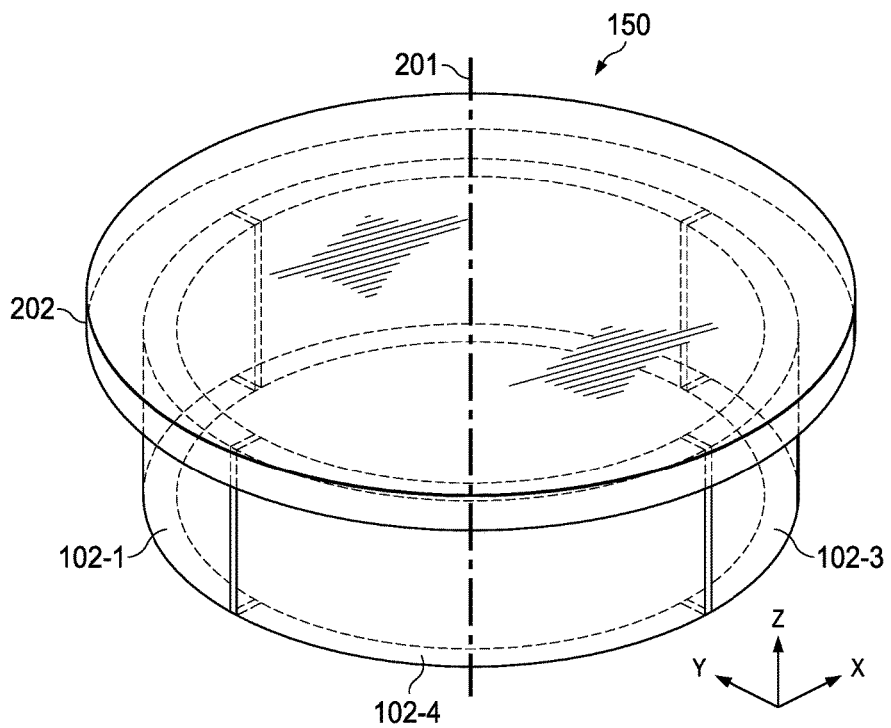
FIG. 3 is a partial perspective view showing four transducer elements radially spaced from the center axis of a lens and angularly spaced from one another around a periphery of the lens in the system of FIGS. 1 and 2.

Referring initially to FIGS. 1-3, an ultrasonic lens cleaning system 150 is illustrated, including a driver integrated circuit (IC) 100 and an even number of transducer segments 102 to clean a lens 202. The illustrated embodiments include an even number NS transducer segments or elements 102 which are mechanically coupled, directly or indirectly, to the lens 202, where NS is an even integer greater than or equal to 4. The individual transducer segments 102 in this example are radially spaced from a center axis 201 of the circular lens 102 and the transducers 102 are angularly spaced from one another around a periphery of the lens 202. As detailed further below, the driver circuit 100 provides phase shifted oscillating signals AS and AC to the transducer segments 102 to generate a mechanical traveling wave rotating around the center axis 201 of the lens 202 to vibrate the lens 202 for improved ultrasonic cleaning. The disclosed driver circuitry 100, systems 150 and methods provide improved lens cleaning solutions compared to standing wave excitation through generation of mechanical travelling waves to create a wave front that propagates around the lens surface. This architecture facilitates more complete lens cleaning.

The cleaning system 150 in FIGS. 1-3 includes a four-segment transducer arrangement (NS=4) in which transducer segments 102-1, 102-2, 102-3 and 102-NS (102-4 in FIG. 3) are curved and extend through individual angles of slightly less than 90 degrees. In one example, the transducer segments 102 are equally angularly spaced around the periphery of the lens 202, although unequal spacing can be used in other examples. Each individual segment 102 has a radial inner side and an outer side for connection to signal sources as described further below. The driver circuit 100 in this example is a driver integrated circuit powered by a battery or other power source 104. FIG. 2 shows a camera lens assembly including the ultrasonic lens cleaning system 150 and the lens 202. The lens assembly includes the transducer segments 102-1 through 102-NS forming a cylindrical or "ring" configuration which is mechanically coupled to vibrate a lens 202. The lens 202 in FIG. 2 is a "fisheye" lens having a curved upper or outer surface as shown in FIG. 2. In other examples, a flat lens 202 or a lens having a different profile can be used. FIG. 3 shows an example with a flat lens 202. The lens 202 in FIG. 2 is mounted into a cylindrical housing 204 with a cylindrical inner spacer structure 206.

The ring-shaped piezoelectric transducer system 102 is disposed between the spacer 206 and the outer wall of the housing 204. Any suitable electromechanical transducer segments 102 can be used, including without limitation piezoelectric transducers or other types of transducers that can vibrate a lens mechanical load. Other shapes and configurations of transducer segments 102 and lens 202 can be used, for example, circular, oval, rectangular or other polygonal shapes. In the illustrated example of FIGS. 1-3, the transducer segments 102 are radially spaced from the center axis 201 of the circular lens 102 and the transducer segments 102 are angularly spaced from one another around the periphery of the lens 202. The circular lens assembly is sealed using an O-ring 208 extending between a peripheral edge of the lens 202 and the outer wall of the housing 204 to prevent ingress of water or debris into the interior of the housing 204. In one example, the housing 204 can be mounted to a motor vehicle to operate as a rear backup camera, or as a forward or side-facing camera. In other examples, the assembly can be mounted to a building or a light pole, for example, for security camera applications. In other examples, the assembly can be used for interior security monitoring systems, such as within a commercial or residential building. In one example, a generally flat second lens 210 is disposed within the inner surfaces of the spacer 206. The second lens 210 and the fisheye lens 202 in FIG. 2 provide an optical path for imaging by a camera 212 along the lens center axis 201. The individual transducer segments 102 includes lead wires connected to first and second multiplexer outputs 142 and 144. The lead wires 142 and 144 extend through an opening 216 in a base 214 of the housing 204 for connection with the driver IC 100 to receive outer and inner side driver signals. The section view of FIG. 2 shows portions of the first and third transducer segments 102-1 and 102-3 in a four-segment configuration, and associated lead wires 142-1, 144-1 and 142-3, 144-3, respectively. The driver IC 100 in general provides an integer number NS sets or pairs of first and second lead wires to accommodate NS transducer segments 102-1, . . . , 102-NS.

The transducer segments 102 are positioned to abut the lower periphery of the lens 202 as shown in FIGS. 2 and 3. In other examples, the transducer segments 102 are mounted with any intervening structure to mechanically couple with the lens 202. In use, particularly in outdoor installations, the upper surface of the lens 202 is subjected to accumulation of dirt, debris, water and other optical obstructions, referred to herein as contaminants. The driver 100 receives input power from a power supply or power source 104, such as a battery providing a battery voltage signal VB with respect to a reference node, such as a ground node GND in one example. The example driver IC 100 includes a terminal 106 (e.g., an IC pin or pad) to receive the battery voltage signal VB from the power supply 104, as well as a ground terminal 108 for connection to GND. The driver IC 100 includes a power management circuit 110 that receives the battery voltage signal VB and provides one or more supply voltages (not shown) to power the internal circuitry of the driver 100. In addition, the IC 100 includes terminals 112-1, 112-2, 112-3, . . . , 112-NS and 114-1, 114-2, 114-3, . . . , 114-NS for connection of multiplexer signal outputs to the lead wires 142-1, 142-2, 142-3, . . . , 142-NS and 144-1, 144-2, 144-3, . . . , 144-NS to deliver driver signals to the transducer segments 102.

The driver 100 provides a set of phase shifted oscillating signals to cause the transducer segments 102 to vibrate the lens 202 to facilitate or promote cleaning of the lens 202 through provision of mechanical travelling waves that rotate around the lens axis 201. In one example, the driver 100 provides phase shifted sinusoidal ultrasonic drive signals to actuate the transducer segments 102 and cause the transducer 102 to mechanically vibrate the lens 202 using ultrasonic waves to remove dirt and/or water from the surface of the lens 202. Non-sinusoidal oscillating signals can be provided, for example, square waves, triangular waveforms or other waveform shapes. Mechanical oscillation or motion of the lens 202 at ultrasonic waves of a frequency at or close to the system resonant frequencies can facilitate energy efficient removal of water, dirt and/or debris from the lens 202. In one example, the driver circuit 100 delivers phase shifted oscillating drive signals to the transducer segments 102 at or near a resonant frequency of the mechanical assembly. A fixed driver signal frequency can be used, or the frequency may be adapted by the driver circuit 100 to accommodate changes over time or different frequencies can be used for cleaning different types of debris from the lens 202. The driver IC 100 in one example tracks changes in the resonant mechanical frequency of an associated lens system, and provides a closed loop system to use this information to maintain cleaning performance over time and in varying environmental conditions.

The driver IC 100 includes a signal generator 130 and a phase shift circuit 132, along with first and second amplifiers 134-1 (AMP 1) and 134-2 (AMP 2) to generate and provide phase shifted oscillating signals AS and AC to the transducer segments 102 to generate a mechanical traveling wave rotating around the center axis 201 of the lens 202. Any suitable amplifier circuitry 134 can be used, for example, a power op amp circuit designed to accommodate the frequency bandwidth of the signals VS provided by the signal generator 130 and the output signal requirements to properly drive a given transducer segment 102. The signal generator circuit 130 generates a first output signal VS that oscillates at a non-zero frequency co. In some examples, the frequency ω is ultrasonic, such as about 20 kHz or more, although not a strict requirement of all implementations of the presently disclosed examples. In certain examples, the signal generator 130 is an analog circuit capable of providing an oscillating output signal VS of any suitable waveform shape in a range of frequencies from 1 kHz through 3 MHz, and can provide the signal VS that concurrently includes multiple frequency components in order to excite the driven transducers 102 at multiple frequencies concurrently. In one example, the signal generator circuit 130 is a pulse width modulated circuit to provide a square wave output signal voltage waveform VS. In other examples, the signal generator 116 provides sinusoidal output voltage signals. In other examples, triangle, saw tooth, or other wave shapes or combinations thereof can be provided by the signal generator 130.

The phase shift circuit 132 receives the first output signal VS and generates a second output signal VC that oscillates at the non-zero frequency ω. The second output signal VC is phase shifted from the first output signal VS by a non-zero angle. In one example, the signal generator circuit 130 generates a sinusoidal first output signal VS represented as VS=K*sin(ωt) and the phase shift circuit 132 provides the second output signal VC=K*cos(ωt) shifted by 90 degrees from the first output signal VS. The first amplifier 134-1 includes an input to receive the first output signal VS, and a first amplifier output 136 to generate a first amplified signal AS based on the first output signal VS. The second amplifier 134-2 includes an input to receive the second output signal VC, and a second amplifier output 138 to generate a second amplified signal AC based on the first output signal VC.

The driver IC 100 interfaces with the transducer segments by connection to the IC terminals grouped as driver signal output terminal pairs 112, 114 individually associated with a corresponding one of the transducer segments 102. The individual driver signal output terminal pairs include a first output terminal 112 coupleable to a first side (e.g., outer side) of a corresponding transducer segment 102, and a second output terminal 114 coupleable to a second side (e.g., inner side) of the corresponding transducer segment 102. The IC 100 may include extra output terminal pairs 112, 114 to allow configuration of the IC to drive different numbers of transducer segments 102 for different applications, such as NS=2, 4, 8, 16, etc. The driver circuit 100 also includes a routing circuit 140 that delivers the first amplified signal AS to a first set of the output terminals 112, 114 and delivers the second amplified signal AC to a second set of the output terminals 112, 114 to generate a mechanical traveling wave to vibrate the lens 202.

The routing circuit 140 can be a fixed interconnection system to route the signals AS and AC to specific output terminals 112, 114. In other examples, a configurable routing circuit 140 can be used to allow reconfiguration of the driver IC 100 for different applications. In the example of FIG. 1, the routing circuit 140 includes an integer number NS multiplexers 141-1, 141-2, 141-3, . . . , 141-NS. The individual multiplexers 141 corresponding to one of the transducer segments 102. The individual multiplexers 141 in various examples include two or more multiplexer inputs. In the example of FIG. 1, a first multiplexer input of the individual multiplexers 141 is coupled with the first amplifier output 136 to receive the signal AS, and a second multiplexer input is coupled with the second amplifier output 136 to receive the second amplified signal AC. The individual multiplexers 141 have first and second outputs, including a first multiplexer output 142 coupled to deliver a first multiplexer output signal SO to a first (e.g., outer) side of the corresponding transducer segment 102. A second multiplexer output 144 is coupled to deliver a second multiplexer output signal SI to a second (e.g., inner) side of the corresponding transducer segment 102. The multiplexers 141-1 through 141-NS provide corresponding outer and inner signals SO-1, SO-2, SO-3, . . . , SO-NS and SI-1, SI-2, SI-3, . . . , SI-NS to the respective transducer segments 102-1, 102-2, 102-3, . . . , 102-NS as shown in FIG. 1.

A select input of the individual multiplexers 141 receives a select signal to select among the inputs. In FIG. 1, two select inputs receive select signals P and SC, respectively. In this example, the P input signals P-1, P-2, P-3, . . . , P-NS are used to select a polarity for the corresponding transducer segment 102-1, 102-2, P-3, . . . , 102-NS, and the SC inputs SC-1, SC-2, SC-3, . . . , SC-NS select between the amplified sine signal AS and the phase shifted, amplified cosine signal AC. The individual multiplexers 141 operate according to the corresponding received select signals P and SC to provide a selected oscillating signal AS or AC to one of the first and second sides of the corresponding transducer segments 102. The other side of the associated transducer segment may be coupled to a reference voltage, such as the constant voltage signal GND, or to the other oscillating signal.

The routing circuit 140 in FIG. 1 includes a lookup table 126 (LUT) to provide the select signals P and SC to the multiplexers 141 according to one or more configuration inputs. In certain examples, the driver IC includes at least one configuration input terminal 116, 118 to allow configuration by an external circuit, such as a host circuit 120. The IC 100 in FIG. 1 includes four terminals 116 to receive a binary coded input NS to specify the number of output multiplexers to be used to drive NS transducer segments 102. Three input terminals 118 are provided to receive a binary coded ND signal designating the number of nodal diameters for the resulting travelling wave. The NS inputs provide the NS signal via lines 122 to the lookup table 126, and the ND inputs provide the ND signal via lines 124 to the lookup table 126.

The LUT 126 in one example is encoded to provide the P and SC signals to configure the multiplexers 140 according to the host-specified NS and ND values to operate the transducer segments 102 to generate a travelling wave to clean the lens 202. The multiplexers 141 in FIG. 1 allow selection from the sinewave AS or the cosine wave AC based on the P and SC signals from the lookup table 126. In other examples (e.g., FIGS. 9 and 11 below), the individual multiplexers 141 include a third multiplexer input coupled with a reference voltage, such as GND. This allows selective interconnection of specific ones of the outer and/or inner transducer segment sides with the amplified sinewave signal AS, the amplified cosine signal AC or the reference voltage GND according to the P and SC signals to establish a mechanical traveling wave excitation of the lens 202. In this regard, the driver IC 100 is configurable by the host circuit 120 to implement a variety of different configurations based on the number of transducer segments (NS) and the number of nodal diameters (ND). The configuration of the multiplexers 141 provides the polarity and the selection of sine or cosine waveforms for the electrode or electrical connection of each side of the transducer segments 102. In the case of piezoelectric transducer segments 102, the segments 102 vibrate when a periodic electrical signal is applied, in order to separate debris from the mechanically coupled lens 202. The entire lens assembly will typically have one or more resonant frequencies determined by the mechanical properties of all the components and the boundary conditions, and the signal generator circuit 130 in certain examples provides the sinewave VS at a frequency ω at or near one of the resonant points for effective, efficient cleaning.

In one example, the lookup table 126 provides the multiplexer select signals to configure the polarity (P) and sine/cosine signal (SC) provided by the individual multiplexers 141. The following table 1 shows an example of these control signals, where AS and AC are sine and cosine amplitude inputs, P and SC are control signal bits. SO and SI are inner and output signal outputs from the multiplexers 141, which are determined by the traveling wave pattern to be excited for lens cleaning. This example can be used for a four-segment system such as those shown in FIGS. 1 and 5-11.

TABLE 1

| P | SC | SO | SI |
|---|----|----|----|
| 0 | 0  | AS | GND |
| 1 | 0  | GND | AS |
| 0 | 1  | AC | GND |
| 1 | 1  | GND | AC |

One example of the contents of the lookup table 126 is shown in Table 2 for a 16-segment system, where NS represents the number of segments and ND represents the number of nodal diameters.

TABLE 2

| NS | ND | P | SC |
|----|----|---|----|
| 16 | 1  | 0000 0000 1111 1111 | 1111 0000 1111 0000 |
| 16 | 2  | 0000 1111 0000 1111 | 0011 0011 0011 0011 |
| 16 | 4  | 0011 0011 0011 0011 | 0101 0101 0101 0101 |

Figure 4:
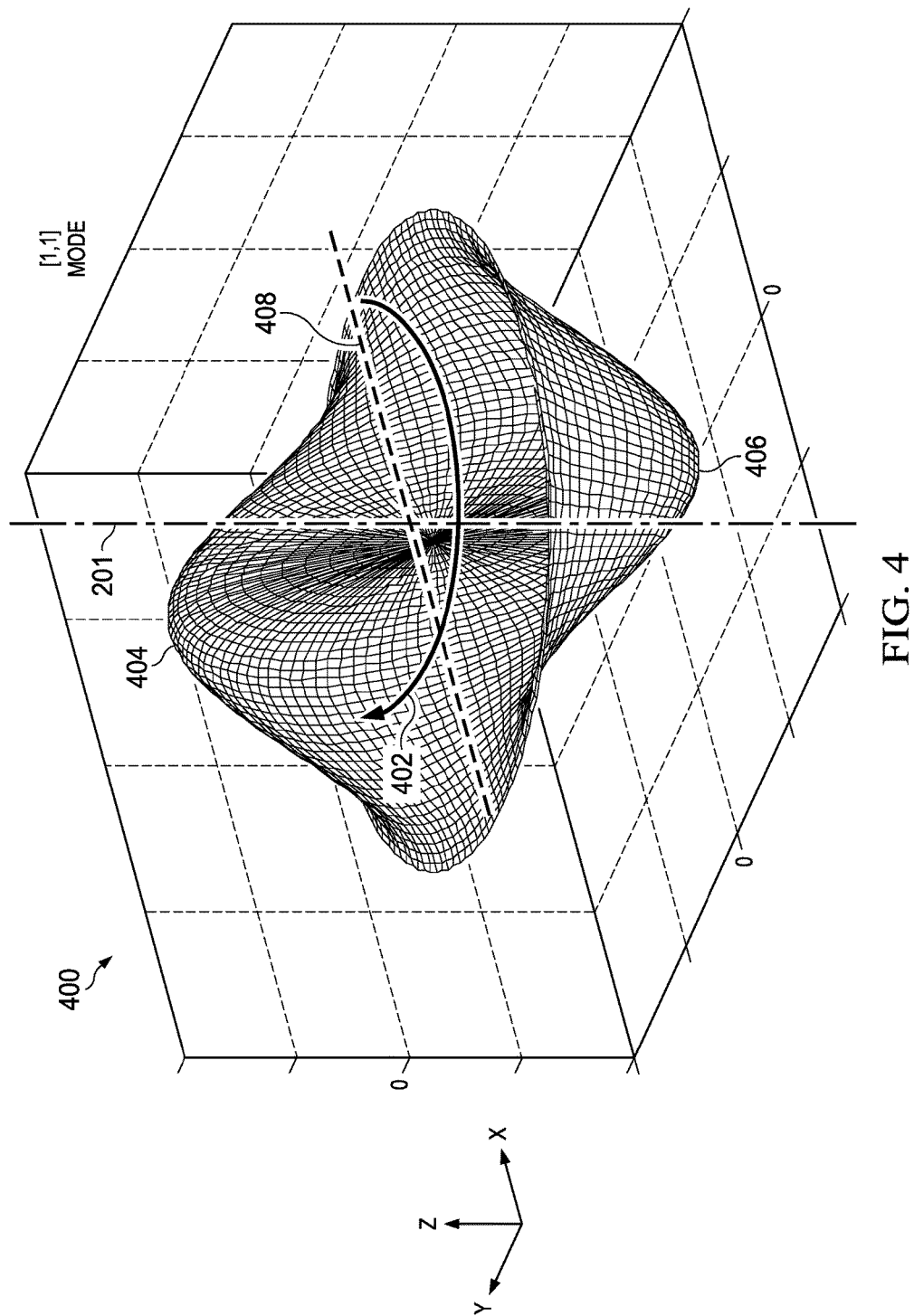
FIG. 4 is a perspective view of a mechanical traveling wave graph implementing a [1,1] mode traveling wave excitation in the system of FIGS. 1-3.
Figure 5:
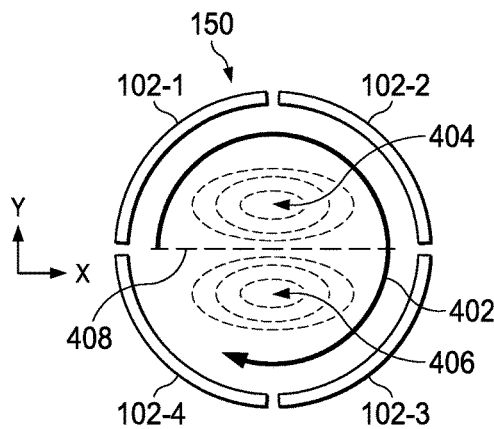
FIGS. 5-8 are simplified top views of the traveling wave rotating around the center axis of the lens in the system of FIGS. 1-3.
Figure 6:
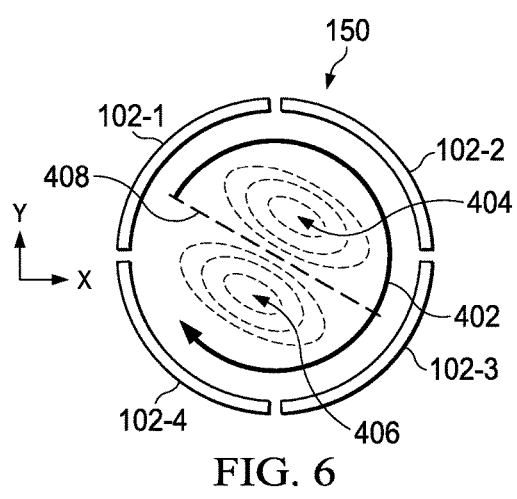
Figure 7:
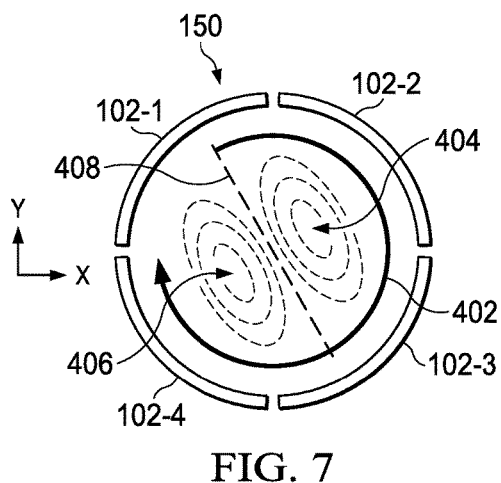
Figure 8:
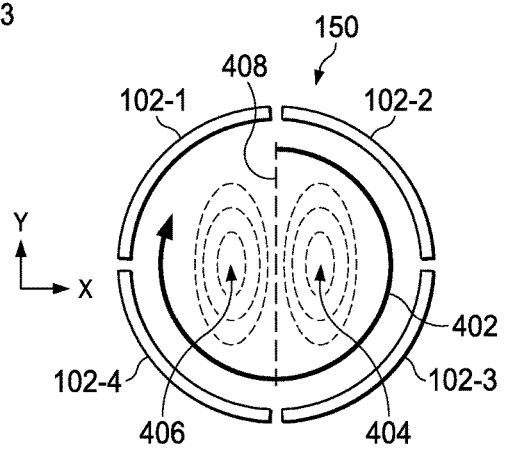

Referring also to FIGS. 4-8, the vibration of the lens surface forms a specific spatial wave pattern, and the selective application of phase shifted signals AC and AS (alone or in further combination with GND connections) to the transducer segment electrodes initiates a traveling wave that rotates about the axis 201 of the lens 202. FIG. 4 shows an example mechanical traveling wave graph 400 implementing a [1,1] mode traveling wave excitation in the system of FIGS. 1-3, and FIGS. 5-8 illustrate the traveling wave rotating around the center axis 201 of the lens 202. The mode designations in these examples are for circular traveling waves [ND,M] mode has ND nodal diameters and M nodal circles (including the boundary), where ND and M are greater than zero. The nodes are points or lines on the lens structure that momentarily are at rest, but the traveling wave excitation causes the nodes to rotate about the lens axis 201. In the example of FIG. 4, the traveling wave rotates in a clockwise direction when viewed from above 402 around the axis 201. In this [1,1] mode example, moreover, a single node diameter 408 extends in the indicated X-Y plane about the Z direction axis 201. FIG. 4 illustrates the traveling wave excitation of a planar lens 202 (e.g., as seen in FIG. 3) lying in the X-Y plane, and the excitation causes Z-direction of motion of the lens 202 with a positive Z-direction displacement maxima 404 and a negative Z-direction displacement minima 406. FIGS. 5-8 provide simplified views of the traveling wave rotating in the direction 402 at different points in time, with FIG. 5 illustrating an initial example position of the maxima 404 and the minima 406 with the intervening single node diameter 408 extending in the X direction at Y=0 between the positive and negative lobes associated with the maximum and minimal points 404 and 406. At the time represented in FIG. 6, the mechanical actuation by the transducer segments 102-1 through 102-4 as rotated the positions of the lobes and the points 404, 406 in the clockwise direction 402 by approximately 30 degree. FIGS. 7 and 8 respectively illustrate further rotation in the direction 402 by additional 30 degree increments, where the node diameter 408 is positioned in the Y-direction in FIG. 8 at X=0. In operation, the phase shifted sinusoidal excitation of the transducer segments 102 causes a continuous rotation of the traveling wave pattern about the Z-direction lens axis 201. As seen in FIGS. 5-8, the node diameter 408 rotates or travels, in contrast to standing wave excitation techniques in which the node diameter would remain stationary. Accordingly, the driver circuit 100 advantageously provides traveling wave excitation in which the surface area of the lens 202 along the node diameter 408 is vibrated and thus cleaned.

The traveling wave excitation can be mathematically represented. The displacement of a clamp circular lens 202 or other circular plate can be represented by the following equation (1):

$$W_{n,m}(r, \theta) = \left[J_n(\beta_{nm}r) - \frac{J_n(\beta_{nm}R)}{I_n(\beta_{nm}R)}I_n(\beta_{nm}r)\right]\begin{bmatrix} \sin n\theta \\ \cos n\theta \end{bmatrix}, \quad (1)$$

Where $J_n$ is the nth Bessel's function, $I_n$ is the modified Bessel function of the first kind, and n and m are mode index numbers, n=0, 1, 2 . . . , m=1, 2, 3, . . . . The natural mode frequencies given by the following equation (2):

$$\omega_{nm} = \frac{\lambda_{nm}^2}{R^2}\sqrt{\frac{D}{\rho T}} \quad (2)$$

Where R is the radius of the circular plate, T is its thickness, $\lambda_{nm}$ is a root to Bessel function equations, D is the lens material stiffness (determined by Young's modulus, Poisson's ratio, etc.), and ρ is the lens material density. Defining the following $$R_{n,m}(r) = \left[J_n(\beta_{nm}r) - \frac{J_n(\beta_{nm}R)}{I_n(\beta_{nm}R)}I_n(\beta_{nm}r)\right],$$

equation (1) can be simplified as shown in the following equation (3):

$$W_{n,m}(r, \theta) = R_{n,m}(r)\begin{bmatrix} \sin n\theta \\ \cos n\theta \end{bmatrix}. \quad (3)$$

Solutions W to a forced response at a resonant frequency ω are given by the following:

$$W_1(r,\theta,t) = AR_{n,m}(r)\cos n\theta \cos \omega t,$$

$$W_2(r,\theta,t) = BR_{n,m}(r)\sin n\theta \sin(\omega t + \alpha)$$

$$W_3 = W_1 + W_2$$

Rearranging $W_3$ yields:

$$W_3(r,\theta,t)=\tfrac{1}{2}R_{n,m}(r)[(A+B\cos\alpha)\cos(n\theta-\omega t)+(A-B\cos\alpha)\cos(n\theta+\omega t)+2B\sin\alpha\sin n\theta\cos\omega t]$$

Setting $\alpha=0$, and $A=B$, the above can be rewritten as the following equation (4):

$$W_3(r,\theta,t)=AR_{n,m}(r)\cos(n\theta-\omega t) \quad (4)$$

The equation (4) defines a travelling wave with angular speed $\omega/n$ in a positive direction $\theta$. By letting $A=-B$, the direction is reversed to the negative $\theta$ direction. The transducer segments 102 in this example form a circular ring shape so that the light can go through the lens 202 in the center along the direction of the axis 201. The circular transducer structure or system in this case is divided into L independent channels or segments (L–NS). This division can be done by physically divide the transducer or just divide the electrodes, with the individually actuatable portions defining transducer segments 102. In this configuration, the individual channels are driven by an input denoted by $S_l$ ($l=1, 2, \ldots, L$). With respect to standing waves of the [ND,1] mode, which has ND nodal diameters, and 1 nodal circle (e.g., the boundary), the angular wave length is $2\pi/ND$. Within the span of one wavelength, an even number of two or more channels can be used to excite the wave, and the entire circle includes ND wave lengths and a minimum of 2ND channels are used. A standing wave of [ND,1] mode can be generated by dividing the transducer into 2ND channels of equal arc length and setting the inputs according to the following:

$$S_{2k-1}=S_0\sin(\omega_0 t), S_{2k}=-S_0\sin(\omega_0 t), k=1,\ldots,N.$$

Where $\omega_0$ is the resonant frequency of [ND,1] mode.

Figure 9:
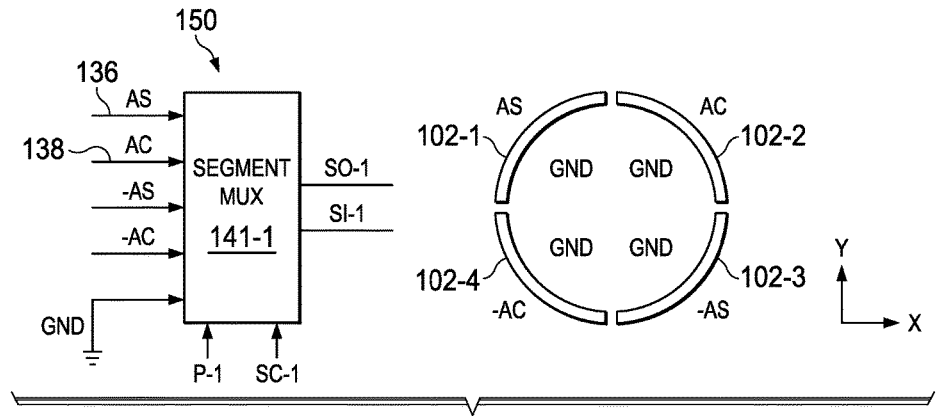
FIG. 9 is a partial schematic diagram illustrating an example signal routing configuration for a four-segment transducer system.

FIG. 9 shows an example signal routing configuration for a four-segment transducer system 102-1 through 102-4. In this case, the corresponding multiplexers (only one illustrated for convenience) each include inputs 136 and 138 to receive the amplified sine and cosine signals AS and AC, as well as a third input receiving a reference voltage signal (e.g., GND). The corresponding outer signal (SO) is provided to the outer side electrode of the corresponding transducer segment 102, and the corresponding inner signal (SI) is provided to the inner side electrode of the transducer segment 102. In the example of FIG. 9, all the inner signals SI are provided as the reference voltage GND. The outer signals as SO are provided as AS for the segment 102-1, AC for the segment 102-2, -AS for the segment 102-3, and -AC for the segment 102-4. This configuration can be used to implement the [1,1] mode traveling wave illustrated in FIGS. 4-8 above.

Figure 10:
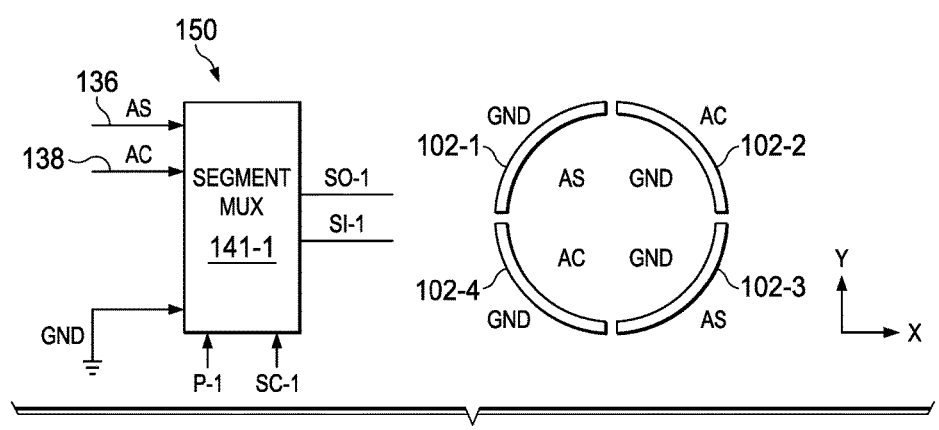
FIG. 10 is a partial schematic diagram illustrating another example signal routing configuration for a four-segment transducer system.

FIG. 10 illustrates another example signal routing configuration to implement the traveling wave of FIGS. 4-8 using a four-segment transducer system. In this case, the inner sides of the segments 102-2 and 102-3 are provided with the reference voltage GND signal, and the outer sides of the segments 102-1 and 102-4 are also connected to GND. The inner side of segment 102-1 and the outer side of segment 102-3 are connected to AS, while the inner side of segment 102-4 and the outer side of the signal 102-2 are connected to AC. This configuration achieves the [1,1] mode traveling wave of FIGS. 4-8.

Figure 11:
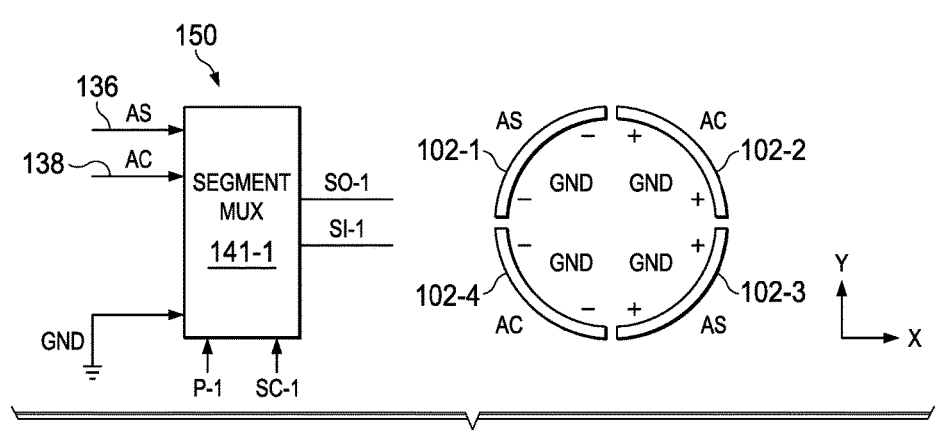
FIG. 11 is a partial schematic diagram illustrating a further example signal routing configuration for a four-segment transducer system with polarized transducer segments.

FIG. 11 shows a further example signal routing configuration for a four-segment transducer system with polarized transducer segments. This configuration also implements the [1,1] mode traveling wave of FIGS. 4-8. The piezoelectric transducer segments 102-1 through 102-4 in this example are subjected to high-voltage polarization, with the segments 102-1 and 102-4 being polarized in a negative (−) direction and the segments 102-2 and 102-3 being positively polarized (+). In this example, a clockwise rotating traveling wave is implemented by the multiplexers 141 connecting the inner segment electrodes to the GND signal, and by connecting the AC signal to the outer sides of segments 102-2 and 102-4, and connecting the AS signal to the outer sides of the segments 102-1 and 102-3.

Figure 12:
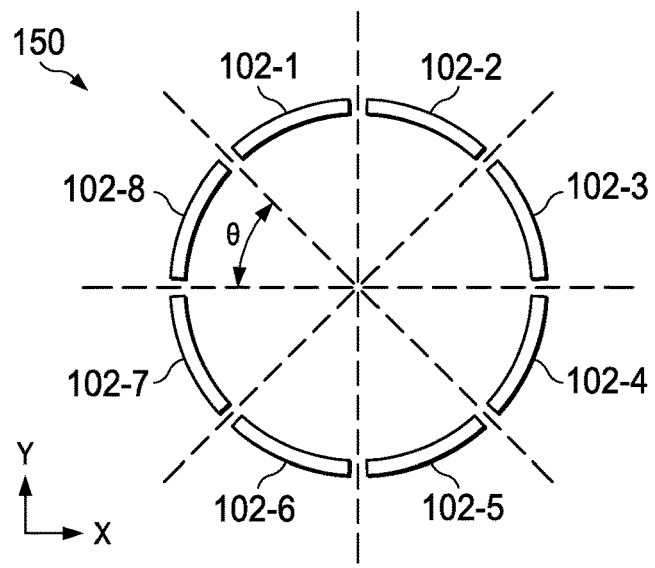
FIG. 12 is a schematic diagram illustrating a top view of an eight-element transducer system.

FIG. 12 shows diagram illustrating a top view of an eight-element transducer system having segments 102-1, 102-2, 102-3, 102-4, 102-5, 102-6, 102-7 and 102-8 disposed around the periphery of a circular lens 202 (not shown). The transducer segments 102 in this example extend around the lens perimeter with an angular spacing angle $\theta$ of 45 degrees.

Figure 14:
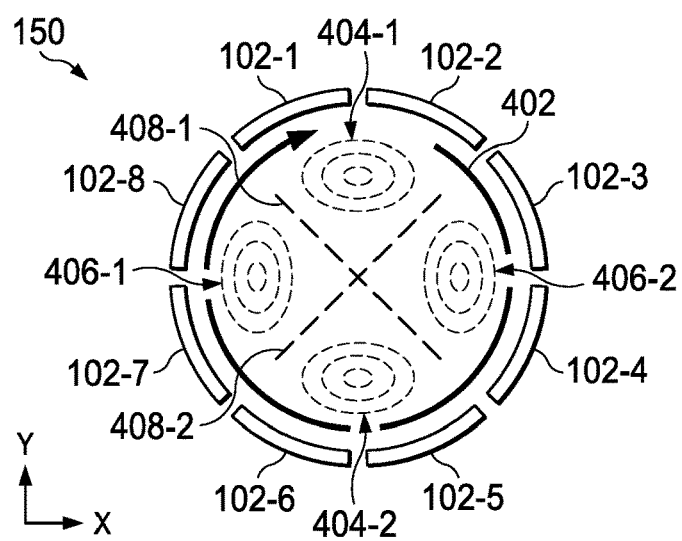
FIG. 14 is a simplified top view of the traveling wave rotating around the center axis of the lens in the system of FIGS. 1-3.
Figure 13:
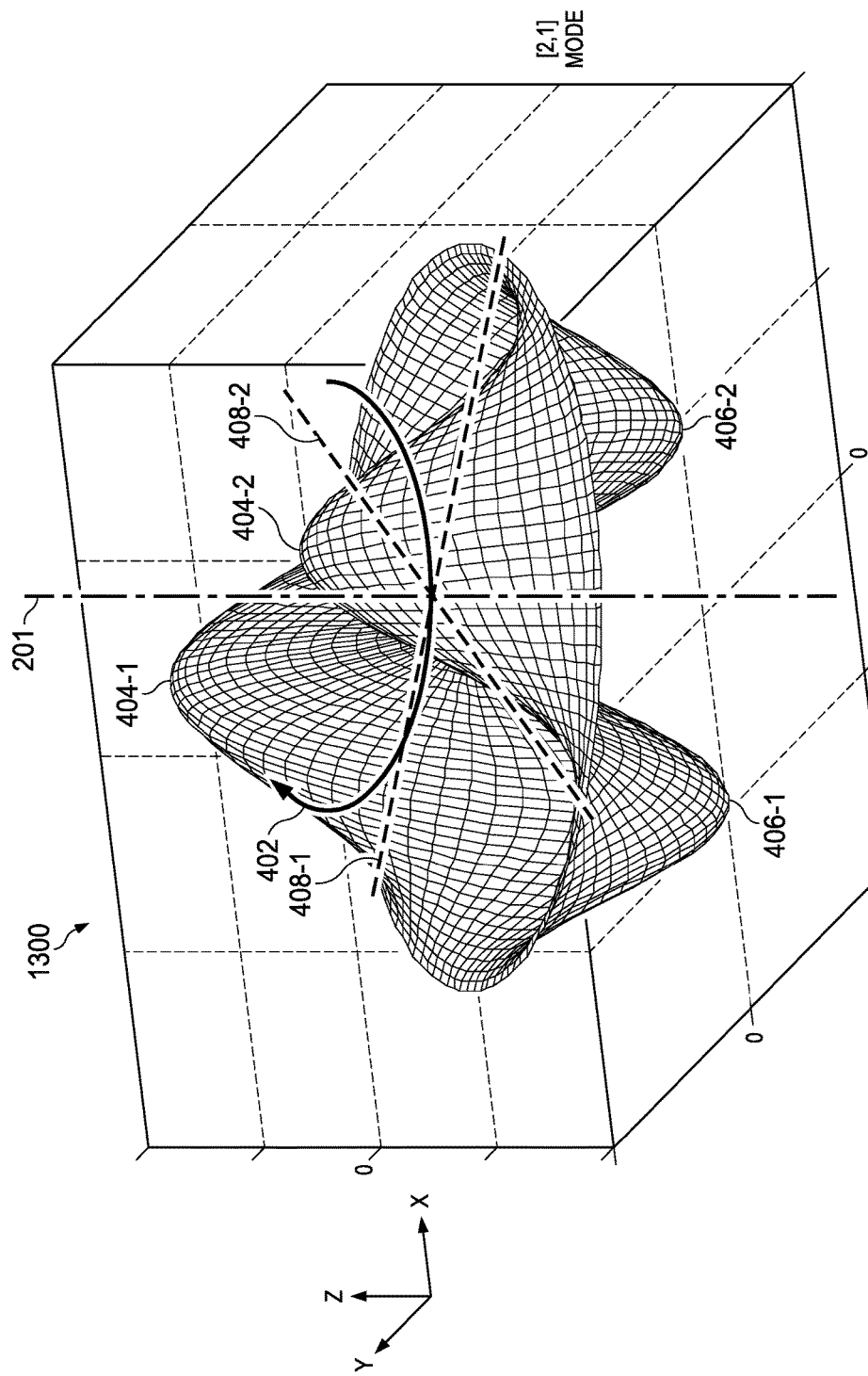
FIG. 13 is a perspective view of a mechanical traveling wave graph implementing a [2,1] mode traveling wave excitation in the system of FIGS. 1-3.

Referring now to FIGS. 13 and 14, FIG. 13 shows is a perspective view of a mechanical traveling wave graph 1300 implementing a [2,1] mode traveling wave excitation in the four-segment system of FIGS. 1-3, and FIG. 14 shows the resulting traveling wave rotating around the center axis 201 of the lens 202. A [2,1] mode traveling wave can be created using for transducer segments 102, where the inputs are specified as S1=S3=−S2=−S4 in order to cause adjacent channels to vibrate in opposite directions, thus creating a traveling wave. As seen in FIGS. 13 and 14, the [2,1] mode traveling wave includes first and second positive peaks or maxima 404-1 and 404-2, as well as a pair of minima 406-1 and 406-2. In addition, the excitation pattern includes first and second node diameters 408-1 and 408-2 offset 90 degrees from one another in the X-Y plane. In other examples, a [2,1] mode traveling wave as shown in FIG. 13 can be implemented using an 8-segment configuration as shown in FIG. 12.

Instead of, or in addition to wiring variation, the polling polarity of the adjacent channels can be alternated while using the same input signal for all channels to generate the [ND,1] mode standing wave. To generate the traveling wave for the [ND,1] mode, two orthogonal [ND,1] standing waves are generated simultaneously, and the interaction of the orthogonal standing waves leads to a travelling wave. A standing wave of [ND,1] mode has angular wave length of $2\pi/ND$, and the two orthogonal modes are rotated with respect to each other by a quarter wave length, which is $\pi/2ND$. Two sets of channels are used to generate the two orthogonal modes, with each individual site generating one of the orthogonal modes. The spatial distribution of the transducer channel for one set is rotated by an angle of $\pi/2ND$ with respect to the other. The inputs to the two sets are $\sin(\omega_0 t)$ and $\cos(\omega_0 t)$, respectively, per the above equation (3). The individual sets use at least 2ND channels to effectively generate the [ND,1] standing wave. The total number of channels is 4ND. The circular ring is divided into 4N channels of equal arc length in this example. A segment of 4 adjacent channels can be used with any number of 2ND segments 102, with a similar pattern of alternate excitation extending around the circle of the lens 202. The individual first sets are driven by sine waves and the second sets are driven by cosine waves. Within the individual sets, the polarity of inputs to the two adjacent channels (angularly spaced by $\pi/ND$) are alternated, as described by the following formulas:

$$S_{4k-3}=S_0\sin(\omega_0 t)$$

$$S_{4k-2}=S_0\cos(\omega_0 t)$$

$$S_{4k-1}=S_0\sin(\omega_0 t)$$

$$S_{4k}=-S_0\cos(\omega_0 t), k=1,\ldots,N$$

This example generates a traveling wave for the [ND,1] mode in which the wave front will rotate around the axis in the direction 402. The rotational direction can be reversed by reversing the polarity of the inputs in any one set, and keeping the other set unchanged.

The above concepts can be extended to higher [ND, M] modes where M>1. The possible examples also begin with first exciting the [ND,M] mode standing waves using a circular ring transducer, or multiple small transducer channels arranged in a circular fashion to excite a [ND,1] mode. M concentric ring transducers can be used to excite the [ND,M] mode, and the design proposed for the single ring [ND,1] mode can then be repeated on each of the M rings to excite a [ND,M] traveling wave. For lens cleaning applications, the center of the lenses transparent for optical transmission and this constraint usually leaves just enough space to install one ring, especially on small diameter lens 202. One option is to use a transparent transducer 102. For example, piezoelectric polymers. With non-transparent ceramic transducers 102, a single ring structure can be used. Although the efficiency may be reduced, a single ring transducer segment can excite modes such as the [ND,2] mode if the input frequency is at or near the [ND,2] resonant frequencies.

Figure 15:
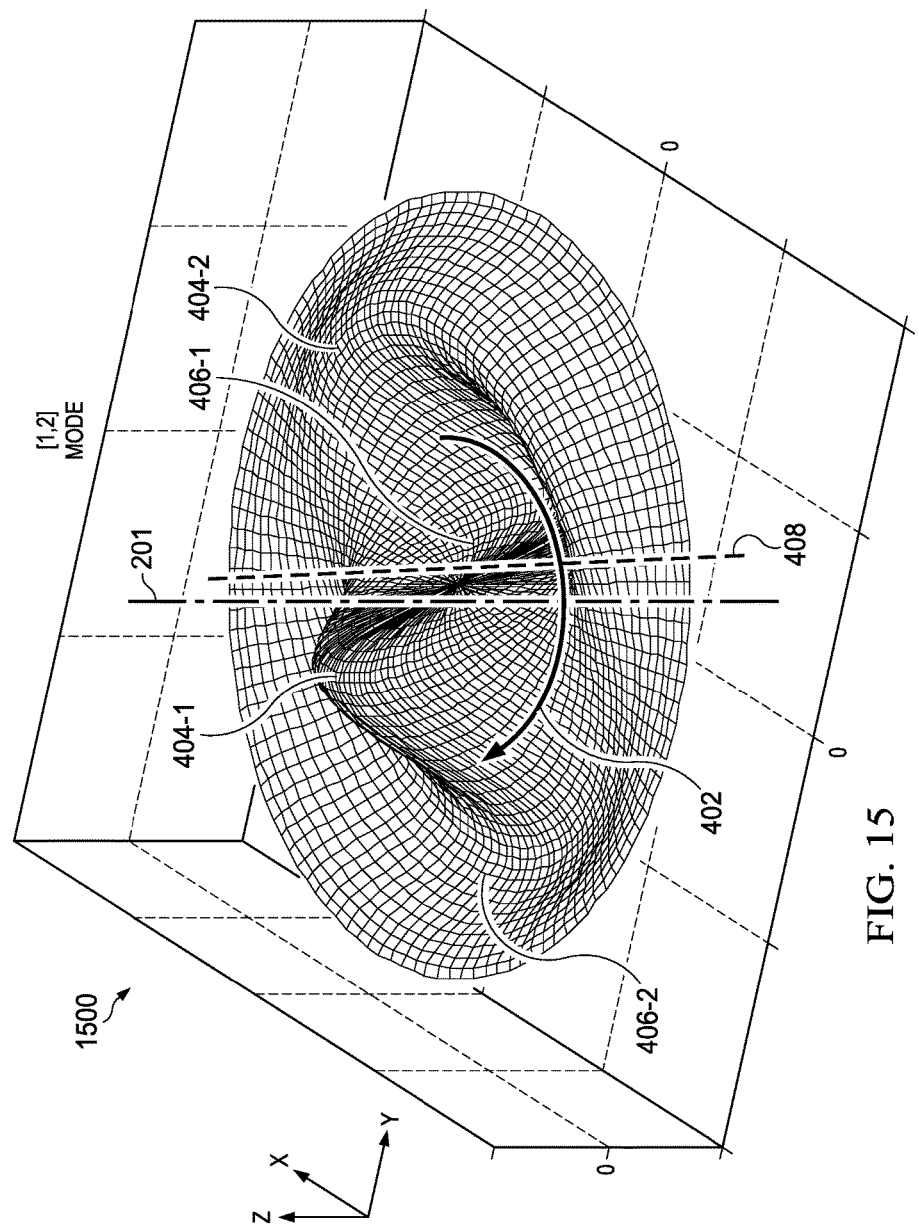
FIG. 15 is a perspective view of a mechanical traveling wave graph implementing a [1,2] mode traveling wave excitation in the system of FIGS. 1-3.
Figure 16:
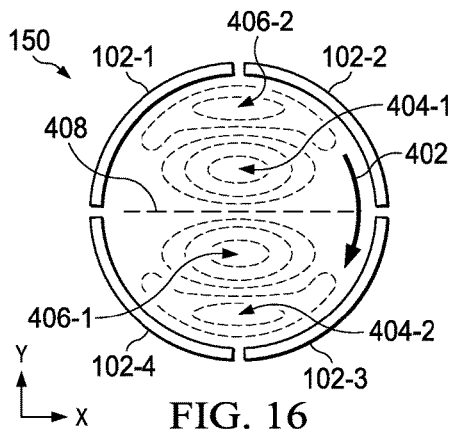
FIG. 16 is a simplified top view of the traveling wave rotating around the center axis of the lens in the system of FIGS. 1-3 and 15.

Referring now to FIGS. 15 and 16, FIG. 15 illustrates an example [1,2] mode traveling wave graph 1500 including a single nodal diameter 408, and 2 nodal circles. The same transducer structure and excitation design can be used for the [1,1] mode to excite a traveling wave at the [1,2] mode by changing the frequency to the higher resonant frequency of the [1,2] mode. FIG. 16 shows a simplified top view of a four-segment implementation with segments 102-1 through 102-4 to generate the [1,2] mode traveling wave shown in FIG. 15. This form of traveling wave includes a narrow lobe peak or maxima 404-1 as well as a local maxima 404-2, in addition to an inner lobe minima 406-1 and a local minima 406-2 shown in FIGS. 14 and 15. One example of traveling wave excitation using the illustrated [1,2] mode with higher frequency results in increased acceleration (e.g., the velocity of the vibration can be increased), which is beneficial to facilitate removal of certain types of debris from the excited lens 202.

Figure 17:
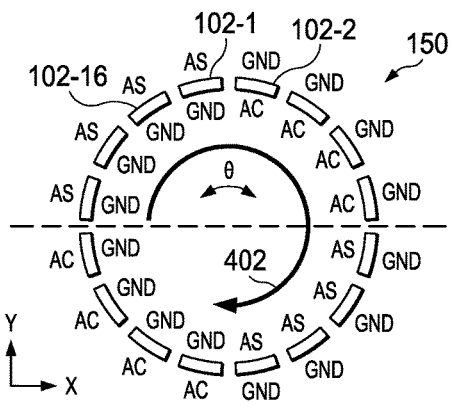
FIG. 17 is a partial schematic diagram illustrating an example signal routing configuration for a 16-segment transducer system.
Figure 18:
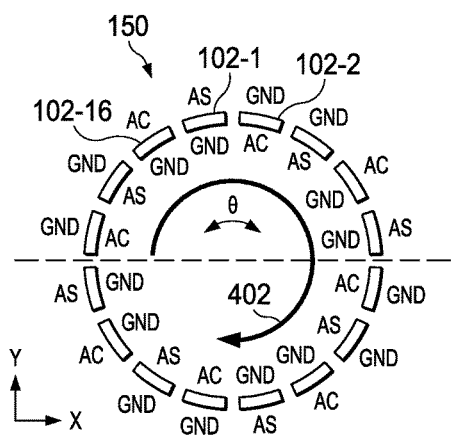
FIG. 18 is a partial schematic diagram illustrating another example signal routing configuration for a 16-segment transducer system.
Figure 19:
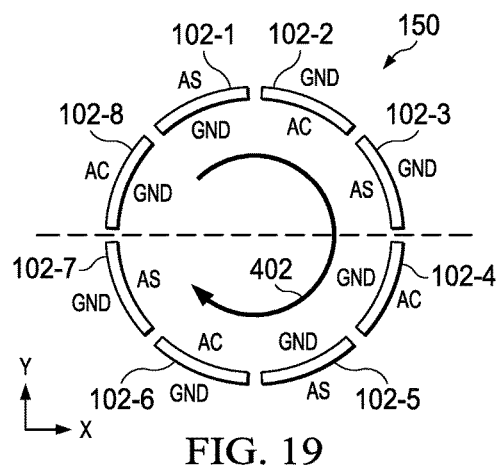
FIG. 19 is a partial schematic diagram illustrating another example signal routing configuration for an eight-segment transducer system.

Referring also to FIGS. 17-19, FIG. 17 illustrates another example signal routing configuration, in this case using a 16-segment transducer system with segments 102-1 through 102-16 with individual segments offset by an angle θ=22.5 degrees. In this example, the inner electrodes of the transducer segments 102 on the left side and the outer electrodes of the segments 102 on the right side are connected to GND. In addition, the outer connections of the transducers in the lower left quadrant and the inner connections on the transducers of the upper right quadrant are connected to the amplified cosine signal AC, whereas the amplified sign signal AS is connected to the outer transducer connections in the upper left quadrant and the interconnections in the lower right quadrant. This configuration provides a traveling wave configuration for NS=16 and ND=1. FIG. 18 shows another 16-segment example in which NS=16 and ND=4. The configuration in FIG. 19 uses an eight-segment transducer arrangement 102-1 through 102-8 for NS=8 and ND=2. In this case, diametrically opposite pairs of segments 102-1, 102-8, 102-4 and 102-5 have the inner sides connected to GND, and the outer sides of the remaining segments 102-2, 102-3, 102-6 and 102-7 are also grounded. The amplified sine signal AS is connected to the outer electrodes of the transducer segments 102-1 and 102-5, and to the inner electrodes of the segments 102-3 and 102-7. The amplified cosine signal AC is connected to the inner electrodes of segments 102-2 and 102-6, as well as to the outer electrodes of the segments 102-4 and 102-8 as shown. A variety of different interconnection schemes can be implemented in fixed routing circuit hardware of the circuit 140, or through configuration of the lookup table 126 in the system 150 of FIGS. 1-3.

The disclosed systems and methods facilitate vibration for lens cleaning across substantially all the lens surface, with the vibration peaks rotating according to a traveling wave established by the driver circuit 100. The traveling wave rotation introduces centrifugal forces to any debris attached to the surface of the lens 202, which helps to propel the debris away from center, where a clean surface is most beneficial for optical transmission of external light to the camera 212. The movement of the wave front also creates shear force along the angular direction. This force is in addition to any shear force created by local bending in the lens material 202. The increased shear force also facilitates removal of certain types of debris.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. An integrated circuit (IC) to drive an ultrasonic lens cleaner, comprising:
   a signal generator circuit to generate a first output signal that oscillates at a non-zero frequency;
   a phase shift circuit to generate a second output signal that oscillates at the non-zero frequency, the second output signal phase shifted from the first output signal by a non-zero angle;
   a first amplifier including an input to receive the first output signal, and a first amplifier output to generate a first amplified signal based on the first output signal;
   a second amplifier including an input to receive the second output signal, and a second amplifier output to generate a second amplified signal based on the second output signal;
   a plurality of driver signal output terminal pairs, the individual driver signal output terminal pairs including:
      a first output terminal coupleable to a first side of a corresponding one of a plurality of transducer segments mechanically coupled to a lens, and
      a second output terminal coupleable to a second side of the corresponding transducer segment; and
   a routing circuit to deliver the first amplified signal to a first set of the output terminals and to deliver the second amplified signal to a second set of the output terminals to generate a mechanical traveling wave to vibrate the lens.

2. The IC of claim 1, wherein the signal generator circuit generates the first output signal as a sinusoidal signal that oscillates at the non-zero frequency.

3. The IC of claim 1, wherein the routing circuit includes an integer number NS multiplexers, the individual multiplexers corresponding to one of the driver signal output terminal pairs, the individual multiplexers including:
   a first multiplexer input coupled with the first amplifier output,
   a second multiplexer input coupled with the second amplifier output, a first multiplexer output coupled to deliver a first multiplexer output signal to the first output terminal of the corresponding driver signal output terminal pair, a second multiplexer output coupled to deliver a second multiplexer output signal to the second output terminal of the corresponding driver signal output terminal pair, and a select input to receive a select signal; and wherein the individual multiplexers are operative according to a received select signal to provide a selected oscillating signal to one of the first and second output terminals of the corresponding driver signal output terminal pair.

4. The IC of claim 3, wherein the routing circuit includes a lookup table to provide the select signals to the multiplexers according to a configuration input signal.

5. The IC of claim 4, further comprising at least one configuration input terminal to provide the configuration input signal to the lookup table from an external circuit.

6. The IC of claim 3, wherein the individual multiplexers include a third multiplexer input coupled with a reference voltage, and wherein the individual multiplexers are operative according to the received select signal to provide a selected oscillating signal to one of the first and second output terminals of the corresponding driver signal output terminal pair and to couple the other one of the first and second output terminals of the corresponding driver signal output terminal pair to the reference voltage.

7. The IC of claim 6, wherein the routing circuit includes a lookup table to provide the select signals to the multiplexers according to a configuration input signal.

8. The IC of claim 7, further comprising at least one configuration input terminal to provide the configuration input signal to the lookup table from an external circuit.

9. The IC of claim 1, wherein the second output signal is phase shifted from the first output signal by 90 degrees.

* * * * *